US010466618B2

(12) United States Patent
Ando

(10) Patent No.: US 10,466,618 B2
(45) Date of Patent: Nov. 5, 2019

(54) TONER BOTTLE FOR DETECTING TONER AMOUNT

(71) Applicant: Murata Manufacturing Co., Ltd., Nagaokakyo-shi, Kyoto-fu (JP)

(72) Inventor: Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/907,604

(22) Filed: Feb. 28, 2018

(65) Prior Publication Data
US 2018/0188670 A1 Jul. 5, 2018

Related U.S. Application Data

(63) Continuation of application No. PCT/JP2016/081805, filed on Oct. 27, 2016.

(30) Foreign Application Priority Data

Dec. 11, 2015 (JP) .................. 2015-242152

(51) Int. Cl.
| G03G 15/08 | (2006.01) |
| G01B 7/16 | (2006.01) |
| G01F 23/00 | (2006.01) |
| G01F 23/20 | (2006.01) |

(Continued)

(52) U.S. Cl.
CPC .......... G03G 15/0856 (2013.01); G01B 7/16 (2013.01); G01B 7/18 (2013.01); G01F 23/0069 (2013.01); G01F 23/20 (2013.01); G01F 23/226 (2013.01); G03G 15/086 (2013.01);

(Continued)

(58) Field of Classification Search
None
See application file for complete search history.

(56) References Cited

U.S. PATENT DOCUMENTS

| 2003/0161644 A1* | 8/2003 | Yokoi | ............... G03G 21/1832 |
| | | | 399/27 |
| 2003/0219263 A1* | 11/2003 | Tsuzuki | ............ G03G 15/0872 |
| | | | 399/27 |
| 2008/0044204 A1 | 2/2008 | Inoue | |

(Continued)

FOREIGN PATENT DOCUMENTS

| JP | H06218942 A | 8/1994 |
| JP | 2005316034 A | 11/2005 |

(Continued)

OTHER PUBLICATIONS

International Search Report issued for PCT/JP2016/081805, dated Nov. 22, 2016.

(Continued)

*Primary Examiner* — David M. Gray
*Assistant Examiner* — Geoffrey T Evans
(74) *Attorney, Agent, or Firm* — Arent Fox LLP

(57) ABSTRACT

One or more toner bottles are provided for supplying toners to development apparatuses. The toner bottles each include bottle portions and displacement sensors. The bottle portions accommodate the toners and are rotated by a drive force of a drive source. The displacement sensors are positioned on sides of the bottle portions and detect deflection amounts of the sides of the bottle portions to determine how much toner is remaining in each toner bottle.

17 Claims, 5 Drawing Sheets

(51) Int. Cl.
*G01F 23/22* (2006.01)
*G03G 15/00* (2006.01)

(52) U.S. Cl.
CPC ....... *G03G 15/087* (2013.01); *G03G 15/0872* (2013.01); *G03G 15/556* (2013.01); *G03G 2215/0663* (2013.01)

(56) References Cited

U.S. PATENT DOCUMENTS

2009/0310984 A1* 12/2009 Sakatani ............ G03G 15/0856
399/30
2013/0011165 A1   1/2013  Inoue

FOREIGN PATENT DOCUMENTS

| JP | 2005331670 A | 12/2005 |
| JP | 2009139517 A | 6/2009 |
| JP | 2014085541 A | 5/2014 |

OTHER PUBLICATIONS

Written Opinion of the International Searching Authority issued for PCT/JP2016/081805, dated Nov. 22, 2016.

* cited by examiner

FIG. 8
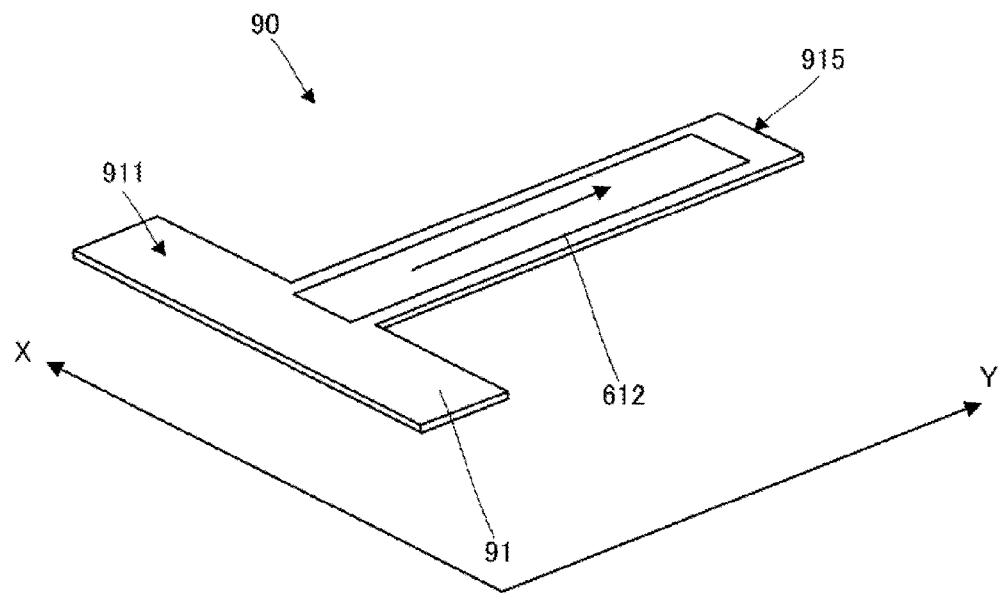
FIG. 9(A)   FIG. 9(B)   FIG. 9(C)
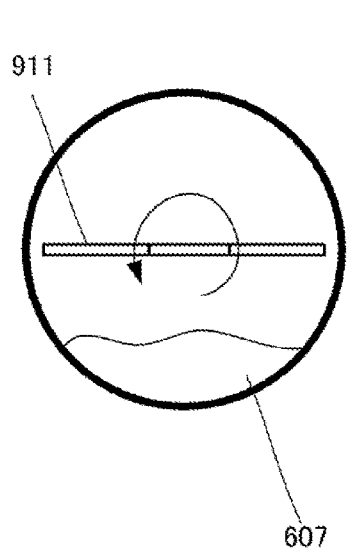 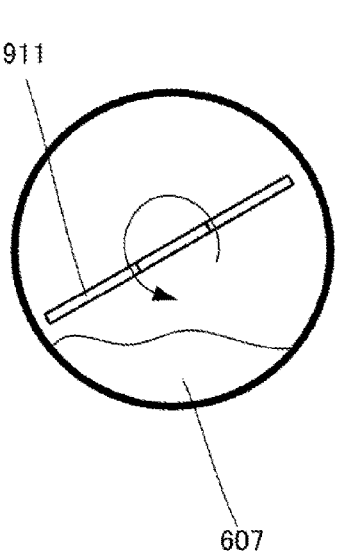 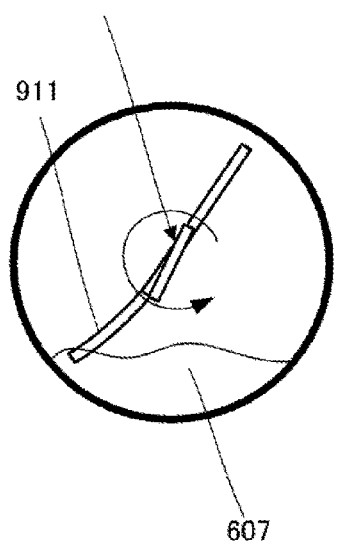

TONER BOTTLE FOR DETECTING TONER AMOUNT

CROSS REFERENCE TO RELATED APPLICATIONS

The present application is a continuation of PCT/JP2016/081805 filed Oct. 27, 2016, which claims priority to Japanese Patent Application No. 2015-242152, filed Dec. 11, 2015, the entire contents of each of which are incorporated herein by reference.

TECHNICAL FIELD

The present disclosure relates to a toner bottle that accommodates toner.

BACKGROUND

Currently, image forming apparatuses form toner images by developing an electrostatic latent image formed on a photoreceptor by using toner in a development apparatus. When the toner in the development apparatus decreases, the toner cannot be supplied to the photoreceptor. Therefore, the image forming apparatus is configured so as to supply toner as appropriate to the development apparatus from a toner bottle attachable to the main body of the apparatus.

The toner bottle includes a cylindrical casing, a spiral rib protruding on the inner peripheral surface of the casing, and an outlet for discharging the toner. In the toner bottle, when the casing rotates, the spiral rib conveys the toner to the outlet.

Typically, in the image forming apparatus, there is no configuration for directly detecting the remaining amount of the toner in the toner bottle. In the conventional image forming apparatus, the consumption amount of the toner is estimated based on the number of printed sheets, and the estimated consumption amount is subtracted from the capacity of the toner bottle to estimate the remaining amount of the toner.

As a result, in order to prevent the toner from being completely consumed, the image forming apparatus notifies a user that, for example, "the toner has run out" when the estimated remaining amount of the toner becomes equal to or less than a predetermined amount. However, at the time of the notification, a substantial amount of the toner is usually remaining in the toner bottle. Nevertheless, since the user needs to replace the toner with a new one, usable toner is thrown away and wasted.

Thereupon, for example, Patent Document 1 (identified below) describes a method of detecting a remaining amount of toner in a toner bottle by measuring the weight of the toner bottle. In the configuration in Patent Document 1, a toner bottle 5 is supported by a support member 52, and the weight is detected based on the movement of the support member 52 moving in a rotation direction about a fulcrum 54.

Patent Document 1: Japanese Patent Application Laid-Open No. 2014-85541.

However, with the configuration in Patent Document 1, in order to detect the weight, it is necessary for the toner bottle 5 and the support member 52 to move in the rotation direction with respect to a deflection member 55 about the fulcrum 54. Therefore, it is necessary to secure a space for the toner bottle 5 and the support member 52 to move, which consumes space and thus limits space saving. Moreover, in order to accurately measure the weight, it is necessary not to fix the toner bottle to surrounding members or to reduce the number of support points so that the toner bottle itself can move. However, the toner bottle has a weight of, for example, about 3 kg, and it becomes difficult to securely support the toner bottle if the number of support points is reduced.

SUMMARY OF THE INVENTION

An object of the present disclosure is to provide a toner bottle configured to detect a remaining amount of toner while solving the above problems.

A toner bottle according to an exemplary embodiment of the present disclosure is provided for supplying toner to a development apparatus. The exemplary toner bottle includes: a bottle portion which accommodates the toner in the bottle portion and is rotated by a drive force of a drive source; and a displacement sensor which is provided on a side of the bottle portion and detects a deflection amount of the side of the bottle portion.

When both ends of the toner bottle are supported, the sides of the bottle portion are deflected by self-weight or the weight of the toner. The deflection amount increases when a large amount of the toner remains in the bottle portion, and the deflection amount decreases when the toner decreases. Therefore, by providing the displacement sensor at the side of the bottle portion of the toner bottle to detect the deflection amount of the side of the bottle portion, it is possible to directly detect the remaining amount of the toner at the present time.

Note that, of the sides of the bottle portion, the vertically lower portion is expanded, and the vertically upper portion is contracted. That is, when the bottle portion rotates, the sides of the bottle portion are expanded and contracted. Therefore, the remaining amount of the toner can be calculated based on the maximum value and the minimum value of electric signals detected by the displacement sensor. Alternatively, the remaining amount of the toner may be calculated based on a difference between the maximum value and the minimum value or may be calculated based on a ratio between the maximum value and the minimum value.

Thus, according to the exemplary embodiments of the present disclosure, it is possible to detect the remaining amount of the toner.

BRIEF DESCRIPTION OF THE DRAWINGS

FIG. 8 is a partially transparent view of a toner bottle according to the exemplary embodiment shown in FIG. 7.

FIGS. 9(A), 9(B) and 9(C) are partially transparent views of toner bottles viewed from bottoms of the toner bottles according to the exemplary embodiment shown in FIG. 7.

DETAILED DESCRIPTION

Figure 1:
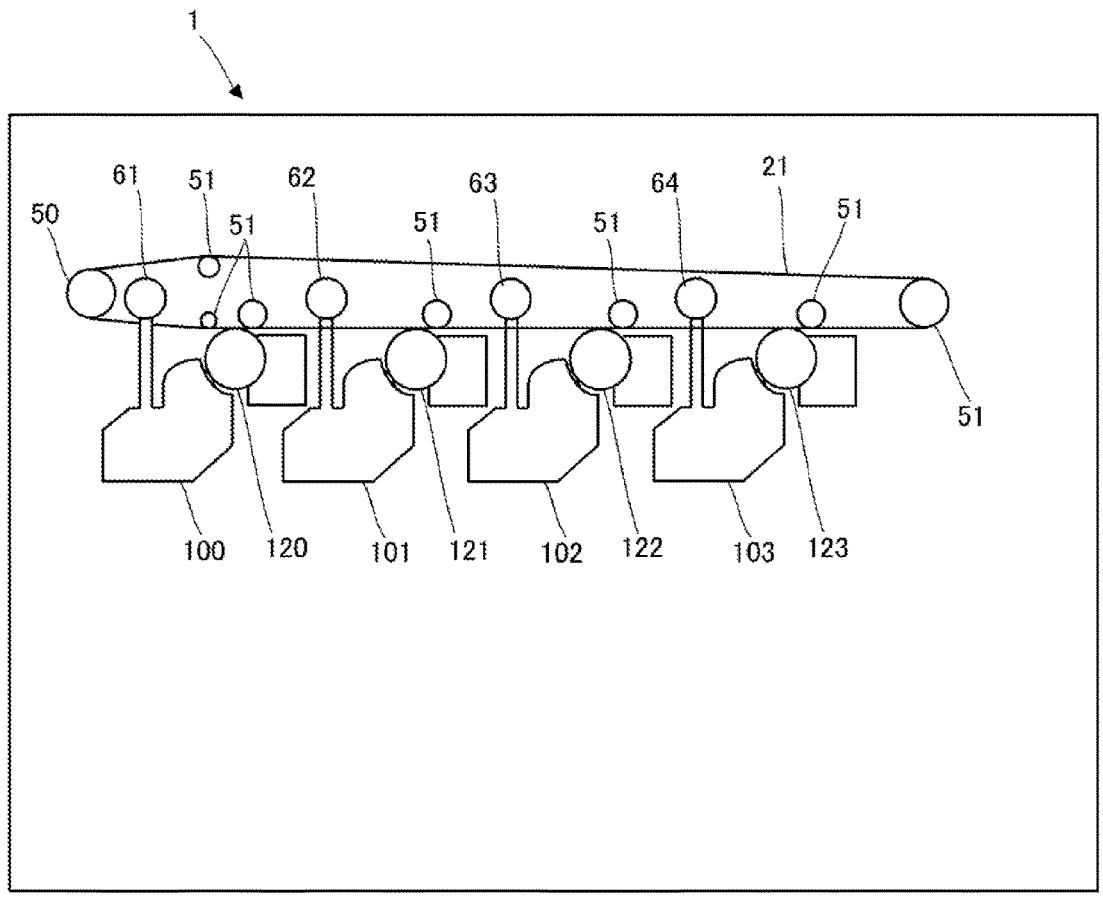
FIG. 1 is a schematic diagram showing a part of an image forming apparatus according to an exemplary aspect.

FIG. 1 is a schematic diagram showing a partial configuration of an image forming apparatus 1. The image forming apparatus 1 is configured to perform multicolor or monochrome electrophotographic image forming processing on a sheet based on image data inputted from an external apparatus (not shown).

As shown, the image forming apparatus 1 includes a transfer belt 21, a drive roller 50, driven rollers 51, a development apparatus 100, a development apparatus 101, a development apparatus 102, a development apparatus 103, a photosensitive drum 120, a photosensitive drum 121, a photosensitive drum 122, a photosensitive drum 123, a toner bottle 61, a toner bottle 62, a toner bottle 63 and a toner bottle 64. In other words, the image forming apparatus 1 includes a plurality of development apparatuses 101-103, a plurality of photosensitive drums 120-123, and a plurality of toner bottles 61-64.

In an exemplary aspect, each of the photosensitive drum 120, the photosensitive drum 121, the photosensitive drum 122 and the photosensitive drum 123 is irradiated with light based on image data, and an electrostatic latent image is formed on the side thereof. The development apparatus 100, the development apparatus 101, the development apparatus 102 and the development apparatus 103 supply toner to the corresponding photosensitive drum 120, photosensitive drum 121, photosensitive drum 122 and photosensitive drum 123, respectively. As a result, toner images are formed on the sides of the photosensitive drum 120, the photosensitive drum 121, the photosensitive drum 122 and the photosensitive drum 123.

The transfer belt 21 is stretched by the drive roller 50 and the driven rollers 51 and moves along the sides of the photosensitive drum 120, the photosensitive drum 121, the photosensitive drum 122 and the photosensitive drum 123. As a result, the toner images formed on the surfaces of the photosensitive drum 120, the photosensitive drum 121, the photosensitive drum 122 and the photosensitive drum 123 are transferred onto the surface of the transfer belt 21.

The toner images formed on the transfer belt 21 are secondarily transferred to a sheet by a secondary transfer unit (not shown). Thereafter, the sheet on which the toner images have been transferred is heated and pressurized by a fixing unit (not shown). As a result, the toner images are firmly fixed on the surface of the sheet.

The toner bottle 61, the toner bottle 62, the toner bottle 63 and the toner bottle 64 are detachably connected to the development apparatus 100, the development apparatus 101, the development apparatus 102 and the development apparatus 103, respectively. When the toners decrease inside the development apparatus 100, the development apparatus 101, the development apparatus 102 and the development apparatus 103, the toners are replenished from the toner bottle 61, the toner bottle 62, the toner bottle 63 and the toner bottle 64, respectively.

Figure 2:
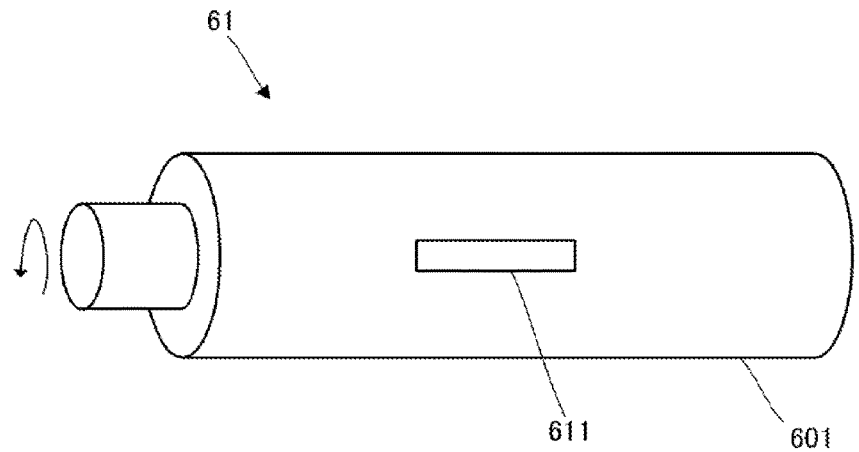
FIG. 2 is an external view of a toner bottle according to an exemplary aspect.

FIG. 2 is an external view of the toner bottle 61. It is noted that the toner bottle 61, the toner bottle 62, the toner bottle 63 and the toner bottle 64 differ only in the colors of the toners accommodated therein, and otherwise all have the same configuration according to the exemplary aspect.

Therefore, in the following description, the toner bottle 61 will be described as a representative, but it should be appreciated that the description applies for each of toner bottles 62-64 as well.

As shown, the toner bottle 61 is formed by a bottle portion 601, which can also be considered a toner container, having a cylindrical shape. The bottle portion 601 accommodates the toner therein and is rotated by the drive force of a drive source (not shown) provided in the image forming apparatus.

Figure 3:
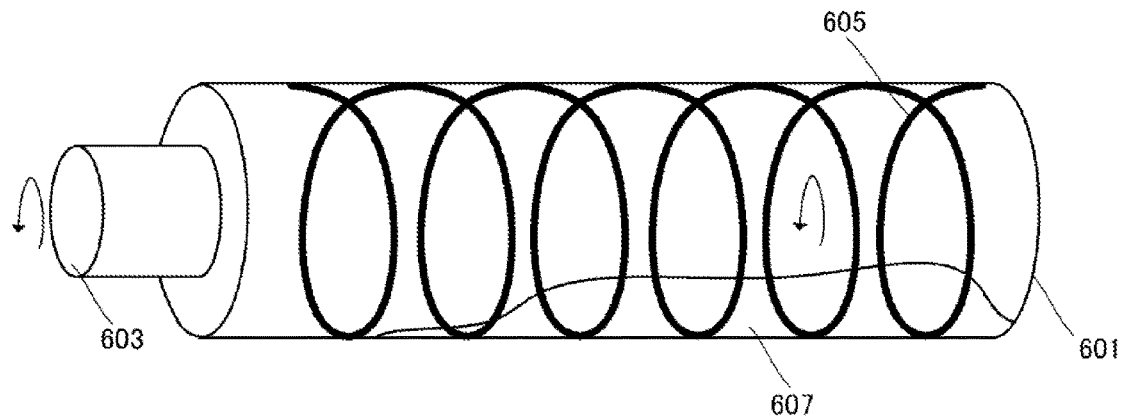
FIG. 3 is a partially transparent view of the toner bottle according to an exemplary aspect.

FIG. 3 is a partially transparent view of the toner bottle 61. When the bottle portion 601 rotates, a toner 607 therein moves to the left, and the toner is supplied to the development apparatus 131 from an outlet 603 at the tip of the bottle portion 601.

A rib 605 having a spiral shape is provided on the inner peripheral surface of the bottle portion 601. When the rib 605 rotates in association with the rotation of the bottle portion 601, the toner 607 accommodated inside the bottle portion 601 is conveyed toward the outlet 603 along a rotation axis direction by the rib 605.

As shown in FIG. 2, a displacement sensor 611 is affixed to the outer peripheral surface of the bottle portion 601. The displacement sensor 611 can be, for example, a resistive strain sensor, a piezoelectric film sensor using a piezoelectric element, or the like. Since the piezoelectric film sensor has lower power consumption and better response than the strain sensor, the piezoelectric film sensor is suitable for use as the displacement sensor of the exemplary embodiment.

Figure 4:
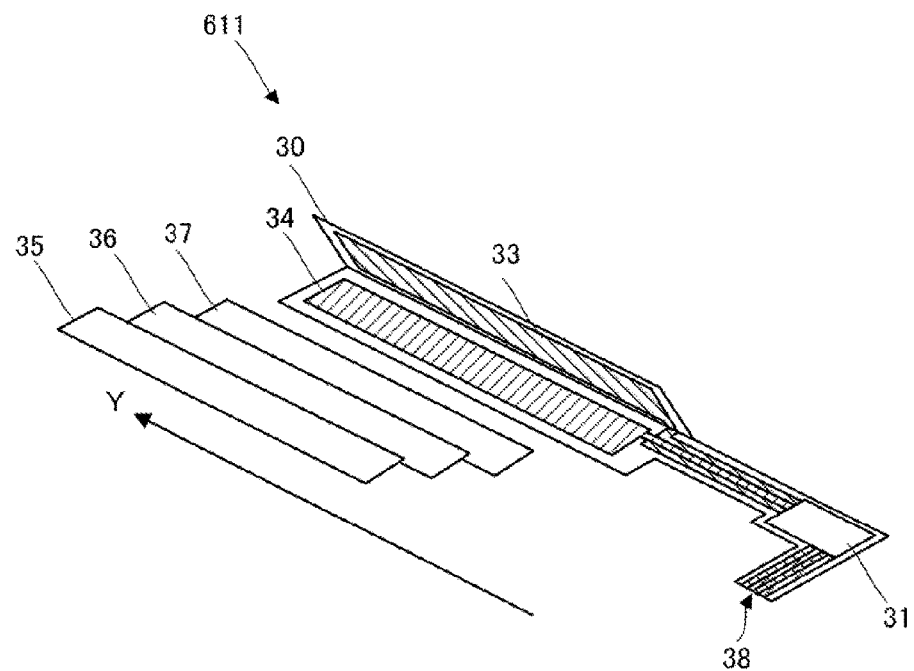
FIG. 4 is an exploded perspective view showing an example of a displacement sensor according to an exemplary aspect.

FIG. 4 is an exploded perspective view showing the structure of the piezoelectric film sensor which is an example of the displacement sensor 611. The piezoelectric film sensor includes an upper electrode 33 and a lower electrode 34 formed on a substrate 30. The substrate 30 is folded between the upper electrode 33 and the lower electrode 34. A piezoelectric film 36 is sandwiched between the upper electrode 33 and the lower electrode 34 with a double-sided tape 35 and a double-sided tape 37 interposed therebetween.

The upper electrode 33 and the lower electrode 24 are connected to a detection circuit 31. The detection circuit 31 is configured to detect an electric signal (electric charge) generated in the piezoelectric film 36.

The piezoelectric film 36 can be any piezoelectric element that is configured to generate an electric signal by the expansion and the contraction, for example, a chiral polymer is preferably used as the piezoelectric element. The piezoelectric film 36 is more preferably a uniaxially stretched polylactic acid (PLA) and further preferably a poly-L-lactic acid (PLLA). The chiral polymer has a main chain with a spiral structure, is uniaxially stretched so that the molecules are oriented, and has piezoelectricity by crystallizing a part of the molecules. Then, the amount of electric charge generated by the uniaxially stretched chiral polymer is uniquely determined by the displacement amount (deflection amount of the bottle portion 601).

A piezoelectric constant of the uniaxially stretched PLLA belongs to a very high class among polymers. On the other hand, since the dielectric constant is low, a voltage output coefficient calculated by dividing the piezoelectric constant by the dielectric constant becomes very large. As a result, the piezoelectric film 36 made of PLLA can detect the deflection amount of the bottle portion 601 with high sensitivity and output a signal according to the deflection amount with high accuracy.

Moreover, since the piezoelectricity is generated by orientation treatment of the molecules by stretching or the like, it is unnecessary to perform poling treatment for the chiral polymer, unlike other polymers such as PVDF or piezoelectric ceramics. Therefore, the piezoelectric constant of PLLA does not fluctuate over time and is extremely stable.

Furthermore, since the polylactic acid has no pyroelectricity, the detected amount of electric charge does not change even when a sensor is disposed at a position close to a heat source (e.g., a fixing unit) in the image forming apparatus and the sensor conducts the heat from the heat source.

In the present embodiment, the piezoelectric film 36 is disposed so that a uniaxial stretching direction forms an angle of approximately 45° with respect to a longitudinal direction (Y direction in FIG. 4) of the piezoelectric film sensor. With such a configuration, the piezoelectric film sensor can detect the expansion and the contraction in the Y direction. Therefore, it is possible to detect the deflection of the bottle portion 601 with high sensitivity.

Figure 5A:
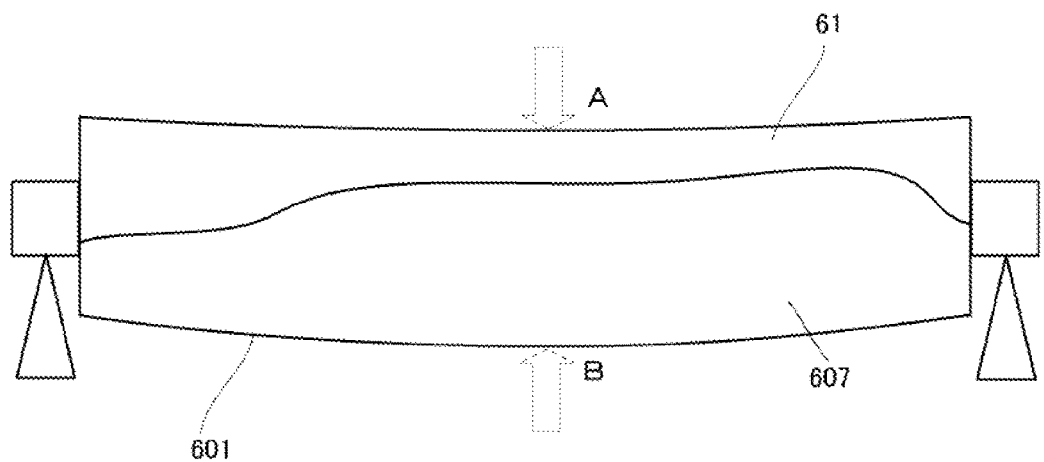
FIGS. 5(A) and 5(B) are diagrams schematically showing a deflection of the toner bottle according to an exemplary aspect.
Figure 5B:
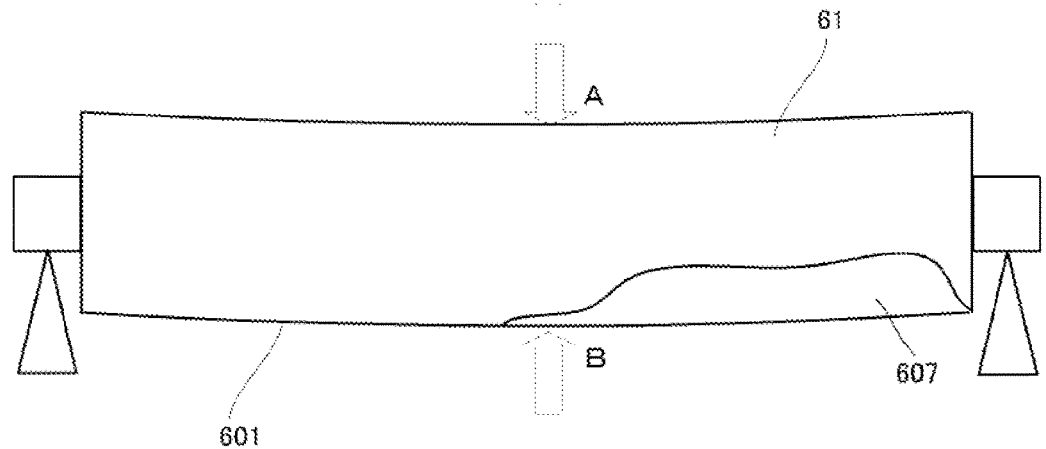

FIGS. 5(A) and 5(B) are diagrams schematically showing a deflection of the toner bottle. When both ends of the toner bottle 61 are supported, the sides (points A and B in FIGS. 5(A) and 5(B)) of the bottle portion 601 are deflected by self-weight. As shown in FIG. 5(A), when a large amount of the toner 607 remains in the bottle portion 601, the deflection amount of the bottle portion 601 increases. In particular, when a large amount of the toner 607 remains in the bottle portion 601, the deflection amount of a vertically lower side (point B in FIG. 5(A)) of the bottle portion 601 increases.

In contrast, as shown in FIG. 5(B), when the toner 607 in the bottle portion 601 decreases, the deflection amount of the bottle portion 601 decreases. In particular, when the toner 607 decreases, the deflection amount of a vertically lower side (point B in FIG. 5(B)) of the bottle portion 601 decreases, and the difference between the deflection amount of the vertically lower side and the deflection amount of the vertically upper side (point A in FIG. 5(B)) decreases. Even when the toner 607 has been completely consumed, a minute deflection amount of the bottle portion 601 is generated due to the self-weight.

According to the exemplary aspect, these deflection amounts are detected by the displacement sensor 611 provided on the side of the bottle portion 601 of the toner bottle 61.

As shown in FIGS. 5(A) and 5(B), of the sides of the bottle portion 601, a vertically lower portion (point B in FIGS. 5(A) and 5(B)) is expanded, and a vertically upper portion (point A in FIGS. 5(A) and 5(B)) is contracted. That is, when the bottle portion 601 rotates, the sides of the bottle portion 601 are expanded and contracted. When the displacement sensor 611 is the piezoelectric film sensor shown in FIG. 4, the displacement sensor 611 outputs electric signals according to such expansion and contraction of the bottle portion 601. Suppose that the electric signals indicate the minimum value (negative value) at the point A where the side of the bottle portion 601 contracts the most, the electric signals indicate the maximum value (positive value) at the point B where the side expands the most.

Therefore, the values of the electric signals detected by the displacement sensor 611 are values corresponding to the remaining amount of the toner 607.

Figure 6:
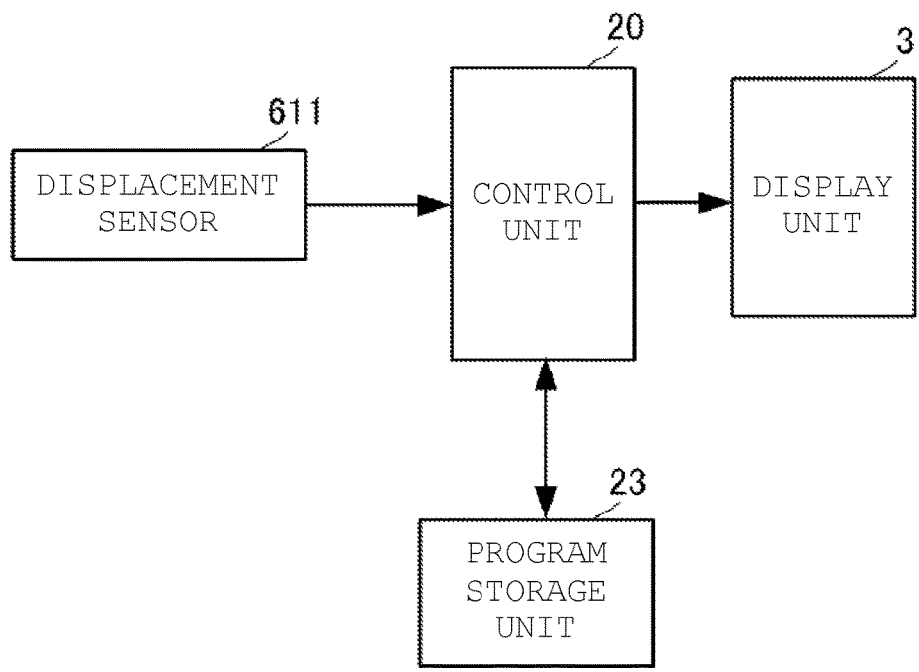
FIG. 6 is a block diagram showing a hardware configuration according to an exemplary aspect.

The displacement sensor 611 is connected a control unit 20 shown in FIG. 6 via a connector unit 38 (see, e.g., FIG. 4) connected to the detection circuit 31.

The control unit 20 can include a processor, microprocessor, or the like that is configured to read out a program stored in a program storage unit 23 and execute predetermined processing. For example, the control unit 20 performs processing of calculating the remaining amount of the toner in the bottle portion 601 based on detection results of the displacement sensor 611.

The control unit 20 also performs processing of displaying the calculated remaining amount of the toner on a display unit 3. According to the exemplary aspect, the display unit 3 is an example of a notification unit. Thus, the displacement sensor 611 is configured to detect the deformation of the bottle portion 601 and simultaneously detect with high sensitivity dynamic sound vibration, high frequency components, of the toner 607 generated in the bottle portion 601. The control unit 20 may also be configured to determine the remaining amount of the toner in combination with this sound vibration. When the remaining amount of the toner decreases, the deflection amount of the bottle portion 601 also decreases so that the detection of the small amount of the toner becomes difficult. However, by performing the judgment of the detection of the remaining amount with dynamic sound signals of the toner, more accurate detection is possible.

According to the exemplary embodiments, a plurality of methods of calculating the remaining amount of the toner can be implemented. For example, the control unit 20 can be configured to calculate the difference between the maximum value and the minimum value outputted from the displacement sensor 611 to calculate the remaining amount of the toner 607. As described above, the deflection amount of the bottle portion 601 increases when a large amount of the toner 607 remains in the bottle portion 601, and the deflection amount of the bottle portion 601 decreases when the toner 607 in the bottle portion 601 decreases. Therefore, the difference between the maximum value and the minimum value of the electric signals outputted by the displacement sensor 611 corresponding to the deflection amount increases as the remaining amount of the toner 607 increases and decreases as the toner 607 decreases.

Alternatively, the control unit 20 can be configured to calculate the remaining amount of the toner 607 by calculating a ratio between the maximum value and the minimum value outputted from the displacement sensor 611. As described above, the deflection amount of the vertically lower side (point B in FIG. 5(A)) of the bottle portion 601 increases when a large amount of the toner 607 remains in the bottle portion 601, and the deflection amount of the vertically lower side (point B in FIG. 5(B)) of the bottle portion 601 decreases when the toner 607 decreases so that the difference between the deflection amount of the vertically upper side (point A in FIG. 5(B)) and the deflection amount of the vertically lower side decreases. Therefore, the ratio between the maximum value and the minimum value of the electric signals outputted from the displacement sensor 611 increases as the remaining amount of the toner 607 increases, and decreases as the toner 607 decreases.

In particular, since each individual of the displacement sensor 611 has a characteristic difference, each individual of the displacement sensor 611 has different output values even if each individual of the displacement sensor 611 has the same deflection amount of the bottle portion 601. However, the individual difference is canceled out by calculating the ratio between the maximum value and the minimum value. Therefore, the control unit 20 can calculate the remaining amount of the toner 607 irrespective of the individual difference of the displacement sensor 611.

Moreover, the control unit 20 is configured to perform correction (calibration) to cancel out the individual difference for each displacement sensor 611 when the remaining amount of the toner 607 is estimated by calculating the difference between the maximum value and the minimum value. For example, a value of the difference between the maximum value and the minimum value calculated at the time of shipment is all corrected to "0".

With the above configuration, the control unit 20 can directly detect the remaining amount of the toner. In a case where the difference between the maximum value and the minimum value of the electric signals outputted by the displacement sensor 611 is calculated, the control unit 20 can judge that the remaining amount of the toner is 0 or near 0 when the value of the difference is less than a predetermined value. Alternatively, in a case where the ratio between the maximum value and the minimum value of the electric signals outputted by the displacement sensor 611 is calculated, the control unit 20 can judge that the remaining amount of the toner is 0 or near 0 when the ratio is 1 (or the ratio indicates a predetermined value near 1).

It is noted that, although the deflection amount of the bottle portion 601 is detected by using one displacement sensor 611 in this example, a plurality of displacement sensors 611 may be provided on the sides of the bottle portion 601 to detect the deflection amount of the bottle portion 601. In this case, the maximum value and the minimum value can be detected by each of the plurality of displacement sensors 611.

It is also noted that the control unit 20 can comprise a control unit, such as a microcomputer, for example, that is provided in the image forming apparatus 1 or by a control unit provided in the displacement sensor 611 or the toner bottle 61. When the control unit 20 is provided in the displacement sensor 611 or the toner bottle 61, information indicating the remaining amount of the toner is outputted from the displacement sensor 611 or the toner bottle 61.

Moreover, the notification unit (the display unit 3 in this example) may also be provided in the displacement sensor 611 or the toner bottle 61 or also serve as the notification unit (display unit) provided in the image forming apparatus 1.

Figure 7:
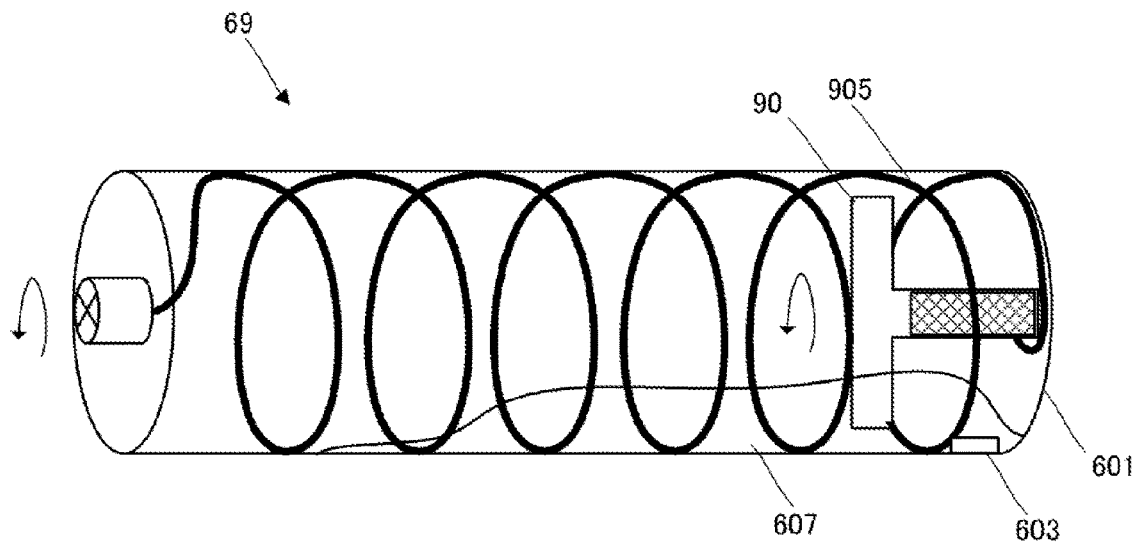
FIG. 7 is a perspective view of a displacement sensor according to another exemplary embodiment.

Next, FIG. 7 is a partially transparent view of a toner bottle 69 according to another exemplary embodiment. FIG. 8 is a perspective view of a displacement sensor 90 used in this exemplary embodiment. In this embodiment, the toner bottle 69 includes a container (bottle portion 601) for accommodating a fluid (toner 607) stirred and a twist sensor 612 which has a substrate 91 and detects a twist of the substrate 91. Moreover, the substrate 91 has a first end 911 that is inserted into the container and a second end 915 that is fixed.

As shown in FIG. 7, in this embodiment, the displacement sensor 90 is provided inside the bottle portion 601 of the toner bottle 69. Moreover, in this embodiment, instead of the rib 605 of the toner bottle 61, a rotor 905 having a spiral shape is provided inside the bottle portion 601. The rotor 905 is made of a thick metal wire in this example. The rotor 905 rotates inside the bottle portion 601 by an external drive source (not shown). When the rotor 905 rotates, the toner 607 accommodated inside the bottle portion 601 is conveyed toward the outlet 603 along a rotation axis direction by the rotor 905.

As shown in FIG. 8, the displacement sensor 90 includes the substrate 91 and the twist sensor 612 affixed to the substrate 91. The substrate 91 is a plate member having a thickness of about 0.1 mm to 0.5 mm. The shape of the substrate 91 in planar view is a T-shape. Among lengths (widths) of the substrate 91 in an X direction, the longest length is slightly shorter than an inner diameter of the bottle portion 601. However, the shape of the substrate 91 in planar view may be, for example, a different shape such as an L-shape. Any shape may be applied as long as the substrate 91 is twisted when the first end 911, a part of the substrate 91, is in contact with the toner (i.e., the fluid to be detected).

Moreover, a thickness of the substrate 91 is changed as appropriate according to a size of the toner bottle (container) and a type of the toner (the fluid to be detected). The substrate 91 is an elastic body and made of, for example, SUS, phosphor bronze, nickel silver, glass epoxy, acrylic, PET or ABS.

The twist sensor 612 is, for example, a piezoelectric film sensor and has the same structure as the structure shown in FIG. 4. In this example, a chiral polymer is preferably used as a piezoelectric film. In particular, the piezoelectric film is more preferably a uniaxially stretched polylactic acid (PLA) and further preferably a poly-L-lactic acid (PLLA). As described above, since the polylactic acid has no pyroelectricity, the detected amount of electric charge does not change even when a sensor is disposed at a position close to a heat source (e.g., a fixing unit) in the image forming apparatus and the sensor conducts the heat from the heat source.

Moreover, in the piezoelectric film in this embodiment, the uniaxial stretching direction coincides with the longitudinal direction (Y direction shown in FIG. 8) of the twist sensor 612. By performing such disposition, the twist sensor 612 can detect twist displacement with high sensitivity when the twist displacement occurs in the substrate 91.

As shown in FIG. 7, a part (e.g., second end 915 of FIG. 8) of the displacement sensor 90 is connected to the rotor 905 and fixed. As a result, the displacement sensor 90 rotates inside the bottle portion 601 together with the rotor 905.

FIGS. 9(A), 9(B) and 9(C) are partially transparent views of toner bottles viewed from bottoms of the toner bottles. However, the illustration of the rotor 905 is omitted. When the displacement sensor 90 rotates together with the rotor 905 and a part (e.g., first end 911) of the substrate 91 touches the toner 607, the first end 911 is bent in a rotation direction by the resistance from the toner 607. On the other hand, since the second end 915 of the substrate 91 is fixed, the twist displacement occurs near the second end 915 in the substrate 91.

As described above, since the uniaxial stretching direction coincides with the longitudinal direction (Y direction shown in FIG. 8) of the twist sensor 612, the piezoelectric film of the twist sensor 612 detects the twist displacement generated in the substrate 91. On the other hand, the piezoelectric film of the twist sensor 612 does not detect bending displacement with respect to the Y direction (or the X direction orthogonal to the Y direction).

If vibration is transmitted to the displacement sensor 90, there is a possibility that bending displacement occurs in the substrate 91. However, the possibility of the occurrence of the twist displacement due to the vibration is extremely low.

Therefore, the displacement sensor 90 outputs electric signals only when the displacement sensor 90 is in contact with the toner 607, and does not output electric signals when other vibration occurs. When the remaining amount of the toner 607 is large, the resistance when the displacement sensor 90 is in contact with the toner 607 increases and the twist displacement increases so that the output values of the outputted electric signals increase. When the remaining amount of the toner 607 decreases, the resistance when the displacement sensor 90 is in contact with the toner 607 decreases and the twist displacement decreases so that the output values of the outputted electric signals decrease. Moreover, when the remaining amount of the toner 607 is exhausted and the toner 607 does not contact the substrate 91 of the displacement sensor 90 even when the rotor 905 rotates, no electric signal is detected at all.

Therefore, the control unit 20 connected to the displacement sensor 90 can directly detect the remaining amount of the toner 607 based on the magnitude of the output values of the electric signals outputted from the displacement sensor 90.

FIG. 7 shows that the rotor 905 rotates and the bottle portion 601 of the toner bottle 69 does not rotate. However, the displacement sensor 90 can be used for the toner bottle in which the bottle portion 601 itself rotates as shown in FIG. 2. In this case, the second end 915 of the twist sensor 612 is fixed to the bottle portion 601.

Finally, it should be appreciated that the description of the above exemplary embodiments should be considered to be illustrative in all respects and not limited. The scope of the present invention is indicated not by the above embodiments but by the claims. Moreover, the scope of the present invention includes a scope equivalent to the claims.

DESCRIPTION OF REFERENCE SYMBOLS

1: Image forming apparatus
3: Display unit
20: Control unit
21: Transfer belt
23: Program storage unit
24: Lower electrode
30, 91: Substrate
31: Detection circuit
33: Upper electrode
34: Lower electrode
35, 37: Double-sided tape
36: Piezoelectric film
38: Connector unit
50: Drive roller
51: Driven roller
61, 62, 63, 64, 69: Toner bottle
90: Displacement sensor
100, 101, 102, 103: Development apparatus
120, 121, 122, 123: Photosensitive drum
131: Development apparatus
601: Bottle portion
603: Outlet
605: Rib
607: Toner
611: Displacement sensor
905: Rotor
911: First end
915: Second end

The invention claimed is:

1. A toner bottle for supplying toner to a development apparatus, the toner bottle comprising:
   a bottle portion configured to accommodate the toner and to rotate by a drive force applied by a drive source;
   a displacement sensor disposed in a center region of a side of the bottle portion and configured to detect a deflection amount of the side of the bottle portion; and
   a control unit configured to calculate an amount of the toner accommodated in the bottle portion based on the deflection amount detected by the displacement sensor, with the calculated amount of toner based on a maximum value and a minimum value of electric signals detected by the displacement sensor.

2. The toner bottle according to claim 1, wherein the displacement sensor comprises a piezoelectric element affixed to the side of the bottle portion and is configured to detect the deflection amount.

3. The toner bottle according to claim 1, further comprising a notification unit configured to display a notification of the calculated amount of the toner calculated by the control unit.

4. The toner bottle according to claim 1, wherein the control unit is further configured to calculate the amount of the toner based on a difference between the maximum value and the minimum value.

5. The toner bottle according to claim 1, wherein the control unit is further configured to calculate the amount of the toner based on a ratio between the maximum value and the minimum value.

6. The toner bottle according to claim 1, wherein the bottle portion comprises a cylindrical shape and the deflection amount is relative to a direction orthogonal to a lengthwise direction of the cylindrical shape.

7. The toner bottle according to claim 1, wherein the displacement sensor is disposed on an outer peripheral surface on the center region of the side of the bottle portion.

8. A toner bottle that indicates an amount of toner accommodated therein, the toner bottle comprising:
   a toner container configured to accommodate the toner for creating an image;
   a displacement sensor disposed in a center of a side of the toner container and configured to detect a deflection amount of the toner container, the deflection amount being based on an amount of toner in the toner container;
   a control unit configured to calculate the amount of the toner in the toner container based on the deflection amount detected by the displacement sensor, with the calculated amount of toner based on a maximum value and a minimum value of electric signals detected by the displacement sensor; and
   a notification unit configured to display a notification of the calculated amount of the toner calculated by the control unit.

9. The toner bottle according to claim 8, wherein the toner container is cylindrical and the deflection amount is relative to a direction orthogonal to a lengthwise direction of the cylindrical toner container.

10. The toner bottle according to claim 8, wherein the displacement sensor comprises a piezoelectric element affixed to the side of the toner container.

11. The toner bottle according to claim 8, wherein the control unit is further configured to calculate the amount of the toner based on a difference between the maximum value and the minimum value.

12. The toner bottle according to claim 8, wherein the control unit is further configured to calculate the amount of the toner based on a ratio between the maximum value and the minimum value.

13. The toner bottle according to claim 8, wherein the displacement sensor is disposed on an outer peripheral surface on the center of the side of the toner container.

14. A toner bottle that indicates an amount of toner accommodated therein, the toner bottle comprising:
   a bottle portion configured to accommodate the toner for creating an image;
   a twist sensor disposed in a center region of the bottle portion and having a fixed end coupled to bottle portion with a free end extending in a space defined by the bottle portion;

a control unit configured to calculate an amount of the toner in the bottle portion based on a detection result generated by the displacement sensor; and a rotor disposed in the cylindrical bottle portion and configured to rotate to output the toner from the cylindrical bottle portion, wherein the twister sensor is configured to detect an amount of toner when the rotor rotates and output the detection result to the control unit, and wherein the twister sensor comprises a substrate with a first portion extending in a lengthwise direction of the bottle portion and including the fixed end and a second portion disposed opposite the fixed end an extending orthogonally to the first portion for detecting the amount of the toner when the rotor rotates.

15. The toner bottle according to claim 14, further comprising a notification unit configured to display a notification of the calculated amount of the toner calculated by the control unit.

16. The toner bottle according to claim 14, wherein the displacement sensor comprises a piezoelectric element.

17. The toner bottle according to claim 14, wherein the twist sensor is disposed on an outer peripheral surface on the center region of the bottle portion.

* * * * *